United States Patent
Biber et al.

(10) Patent No.: US 12,504,490 B2
(45) Date of Patent: Dec. 23, 2025

(54) DETECTOR UNIT FOR A MAGNETIC RESONANCE DEVICE WITH GRADIENT COIL UNIT, SHIM UNIT, AND RADIO-FREQUENCY ANTENNA UNIT

(71) Applicant: Siemens Healthineers AG, Forchheim (DE)

(72) Inventors: Stephan Biber, Erlangen (DE); Stefan Stocker, Grossenseebach (DE); Andrew Dewdney, Neunkirchen am Brand (DE); Jürgen Nistler, Erlangen (DE); Ludwig Eberler, Neumarkt I.d. Opf. (DE); Simon Körber, Hallerndorf (DE)

(73) Assignee: Siemens Healthineers AG, Forchheim (DE)

( * ) Notice: Subject to any disclaimer, the term of this patent is extended or adjusted under 35 U.S.C. 154(b) by 164 days.

(21) Appl. No.: 18/419,332

(22) Filed: Jan. 22, 2024

(65) Prior Publication Data
US 2024/0248160 A1 Jul. 25, 2024

(30) Foreign Application Priority Data
Jan. 24, 2023 (DE) .................. 10 2023 200 497.6

(51) Int. Cl.
*G01R 33/42* (2006.01)
*G01R 33/385* (2006.01)
*G01R 33/3873* (2006.01)
*G01R 33/422* (2006.01)

(52) U.S. Cl.
CPC ......... *G01R 33/422* (2013.01); *G01R 33/385* (2013.01); *G01R 33/3873* (2013.01)

(58) Field of Classification Search
CPC ............... G01R 33/422; G01R 33/385; G01R 33/3873; G01R 33/34; G01R 33/38; G01R 33/3802; G01R 33/48
See application file for complete search history.

(56) References Cited

U.S. PATENT DOCUMENTS

| | | | |
|---|---|---|---|
| 4,871,969 A | 10/1989 | Roemer et al. | |
| 5,349,297 A | 9/1994 | DeMeester et al. | |
| 5,550,472 A * | 8/1996 | Richard | G01R 33/3873 324/319 |
| 2007/0030004 A1* | 2/2007 | Amor | G01R 33/3873 324/318 |

(Continued)

*Primary Examiner* — G.M. A Hyder
(74) *Attorney, Agent, or Firm* — Banner & Witcoff, Ltd.

(57) ABSTRACT

The disclosure relates to a detector unit comprising a radio frequency antenna unit and a gradient coil unit surrounding the radio frequency antenna unit concentrically, each embodied as hollow cylinders surrounding a cylinder axis in the longitudinal direction. The detector unit comprises at least four shim units, which are embodied as oblong shapes and are each arranged in parallel to the cylinder axis at various positions in the circumferential direction on a first inner surface, with said first inner surface corresponding to the side of the gradient coil unit facing towards the cylinder axis, and forming raised areas in the direction of the cylinder axis. The detector unit comprises a fixing unit embodied for fixing the at least four shim units to the gradient coil unit, and an RF screen, which is arranged at least partly between the radio frequency antenna unit and the gradient coil unit.

17 Claims, 7 Drawing Sheets

(56) References Cited

U.S. PATENT DOCUMENTS

| | | | |
|---|---|---|---|
| 2010/0085053 A1* | 4/2010 | Iwasa | G01R 33/3856 |
| | | | 324/318 |
| 2010/0237867 A1* | 9/2010 | Slade | G01R 33/3873 |
| | | | 324/314 |
| 2014/0062484 A1* | 3/2014 | Kwak | G01R 33/3804 |
| | | | 324/322 |

* cited by examiner

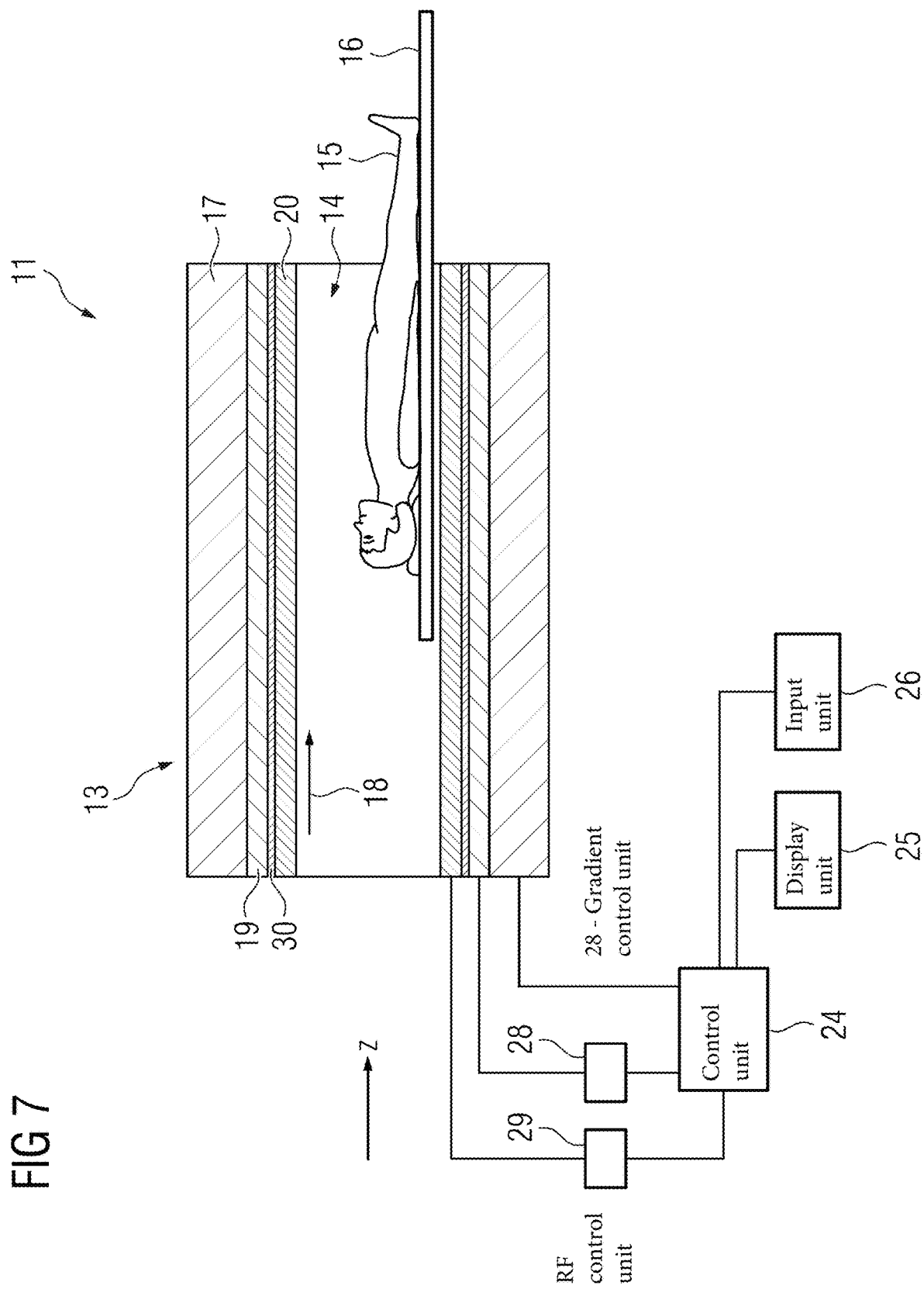

DETECTOR UNIT FOR A MAGNETIC RESONANCE DEVICE WITH GRADIENT COIL UNIT, SHIM UNIT, AND RADIO-FREQUENCY ANTENNA UNIT

CROSS-REFERENCE TO RELATED APPLICATIONS

The present application claims priority to and the benefit of is Germany Patent Application no. DE 10 2023 200 497.6, filed Jan. 24, 2023, the contents of which are incorporated herein by reference in its entirety.

TECHNICAL FIELD

The disclosure relates to a detector unit and to a magnetic resonance device.

BACKGROUND

In a magnetic resonance device the body of an object to be examined, in particular of a patient, is usually subjected with the aid of a main magnet to a relatively high main magnetic field, for example of 1.5 or 3 or 7 Tesla. In addition, gradient pulses are emitted with the aid of a gradient coil unit. Then, by means of suitable antenna facilities, high frequency radio frequency pulses, i.e. RF pulses, are sent out, which leads to the nuclear spins of specific atoms excited resonantly by these radio frequency pulses being flipped by a defined flip angle in relation to the magnetic field lines of the main magnetic field. During the relaxation of the nuclear spins radio frequency signals, so-called magnetic resonance signals, are emitted, which are received by means of suitable radio frequency antennas and are then further processed. Finally, the desired image data can be reconstructed from the raw data acquired in this way.

Therefore, for a specific measurement, a specific magnetic resonance control sequence (MR control sequence), also called a pulse sequence, is to be sent out, which consists of a sequence of radio frequency pulses, for example excitation pulses and refocusing pulses, as well as gradient pulses matching them to be sent out in a coordinated manner in various gradient axes along various spatial directions. Readout windows matching them in respect of time are set, which specify the periods of time in which the induced magnetic resonance signals will be acquired.

In magnetic resonance imaging by means of a magnetic resonance device the homogeneity of a main magnetic field in an examination volume is of great importance. Even small deviations in the homogeneity can result in large deviations in a frequency distribution of the nuclear spins, which can reduce the quality of the magnetic resonance image data.

In order to improve the homogeneity in the examination volume shim units are known. If a magnetic resonance device is installed at its intended location, fields present in the environment can restrict the homogeneity of the main magnetic field, in particular around an isocenter of the magnetic resonance device. Therefore, during installation and commissioning of a magnetic resonance device, frequently in conjunction with measurements, the shim unit is set in such a way that a homogeneity that is as optimal as possible is established. The shim unit typically comprises at least one shim box, at least one shim box receptacle and at least one shim plate.

Conventionally, the shim unit is integrated into the gradient coil unit. The gradient coil unit is typically embodied in the shape of a hollow cylinder and has elongated openings at a number of positions in the circumferential direction in parallel to the cylinder axis, in particular in parallel to the longitudinal direction. Each such elongated opening can be designated as a shim box receptacle. The length of the shim box receptacle in the longitudinal direction typically corresponds to the length of the gradient coil unit in the longitudinal direction. The shim box receptacle can also be shorter than the gradient coil unit and for example have an opening, starting from a long end of the gradient coil unit. The shim box receptacle is typically embodied tubular in shape and/or in the shape of a hollow cylinder. The shim box receptacle can be embodied as a four-sided tube. The shim box receptacle typically surrounds a void. The shim box receptacle typically has a rectangular cross section or round cross section or a cross section of the shape of a circle segment. The shim box receptacle is typically designed to accommodate a shim box, in particular in its opening and/or in its void. The shim box can be positioned manually and/or mechanically in the shim box receptacle, in particular in its opening and/or in its void. The shim box is preferably flush with the shim box receptacle in the radial direction and/or flush in the circumferential direction. Depending on the inhomogeneity of the main magnetic field, in particular due to the environment, shim plates are arranged within the shim box. The shim plates are typically arranged at defined and individual positions within the shim box, in order, thanks to their susceptibility, to increase the homogeneity of the main magnetic field. Typically the shim plates will be arranged outside the gradient coil unit at the corresponding position of the shim box and placed together with the shim box within the shim box receptacle, in particular pushed into the shim box receptacle. Conventionally, shim plates are made of iron.

SUMMARY

The underlying object of the disclosure is to specify an especially space-saving detector unit. The object is achieved by the features of the independent claims. Advantageous embodiments are described in the dependent claims.

The diameter of the patient receiving area of a magnetic resonance device correlates with the comfort of the patient: the greater the diameter of the radio frequency antenna unit, the more comfortable it is for the patient. Typically, the radio frequency antenna unit, the gradient coil unit, and the superconducting magnet for generation of the main magnetic field, i.e. the main magnet, are arranged concentrically to one another. The greater the internal diameter of the main magnet, the more inefficiently the main magnetic field is able to be produced, and the more measures and costs are required to generate a sufficient homogeneity of the main magnetic field. Consequently, it is desirable for a detector unit, in particular arranged within the main magnet, which in particular comprises the radio frequency antenna unit, the gradient coil unit, and shim units, to have a wall thickness that is as thin as possible.

The detector unit as described herein comprises a radio frequency antenna unit and a gradient coil unit surrounding the radio frequency antenna unit concentrically. The radio frequency antenna unit and the gradient coil unit are each embodied as hollow cylinders surrounding a cylinder axis in the longitudinal direction. The detector unit comprises at least four shim units, which are embodied as oblong shapes and are each arranged in parallel to the cylinder axis at various positions in the circumferential direction on a first inner surface, with said first inner surface corresponding to the side of the gradient coil unit facing towards the cylinder axis. The shim units in this case form local raised areas on the first inner surface in the direction of the cylinder axis. The detector unit comprises a fixing unit, which is embodied for fixing the shim units to the gradient coil unit. The detector unit comprises an RF screen, which is arranged at least in part between the radio frequency antenna unit and the gradient coil unit.

The radio frequency antenna unit and the gradient coil unit are typically arranged concentrically to one another. The shim units are typically each at an equal distance from the cylinder axis. The first inner surface is typically embodied in the shape of a hollow cylinder. The shim units typically each have a contact surface with the first inner surface and are accordingly arranged on the first inner surface. In particular the distance between a shim unit and the first inner surface typically amounts to less than 2 mm, preferably to less than 1 mm, especially preferably to less than 0.5 mm.

The form and/or arrangement of the shim units typically determines the form and/or position of the local raised areas. The shim units typically have a design and/or form that is the same. The shim units are typically arranged symmetrical to the cylinder axis and/or at equal distances from each other in the circumferential direction. The shim units may e.g. comprise at least four, at least eight, at least twelve shim units, etc. Each of the shim units typically has a height, e.g. a spatial extent in the radial direction, of any suitable range, e.g. between 3 mm and 20 mm, between 3 mm and 15 mm, between 3 mm and 12 mm, etc. The shim units are typically arranged between the gradient coil unit and the radio frequency antenna unit. The shim units are typically each embodied as elongated and/or oblong-shaped units. The longitudinal axis of each of the shim units is typically parallel to the cylinder axis.

The fixing unit is embodied for fixing the shim units to the gradient coil unit, e.g. to the first inner surface. Each shim unit typically comprises a shim box receptacle and a shim box, wherein the shim box receptacle largely surrounds the shim box. In this case, the fixing unit is typically embodied for fixing the (e.g. at least four) shim box receptacles to the gradient coil unit. The fixing unit can be embodied such that the fixing of the shim units to the gradient coil unit is embodied as permanent and/or at least as partly releasable or releasable. The fixing unit may be implemented for instance for a mechanical fixing of the shim units to the gradient coil unit.

The RF screen is conventionally arranged between the gradient coil unit and the radio frequency antenna unit. The RF screen comprises at least partly electrically conductive material. The RF screen is typically embodied to reduce radio frequency pulses generated by the radio frequency antenna unit penetrating into the gradient coil unit. The RF screen is typically embodied in such a way that said screen is largely transparent for gradient pulses generated by the gradient coil unit. This is possible due to the different frequencies of the radio frequency pulses and the gradient pulses. U.S. Pat. No. 4,871,969 discloses fundamentals of an RF screen, as is known to the person skilled in the art. The RF screen may e.g. have a structuring and/or slits and/or indentations, which can contribute to the desired modulation of the radio frequency pulses.

The detector unit as described herein accordingly makes provision for the shim units to be arranged in the radial direction at least partly between the gradient coil unit and the radio frequency antenna unit. Due to the different positions of the shim units in the circumferential direction, typically one shim unit at most is arranged in the radial direction between the gradient coil unit and the radio frequency antenna unit at a position in the circumferential direction. The detector unit may e.g. be embodied in such a way that the gradient coil unit is free from a shim unit. The detector unit makes possible a space-saving arrangement of the shim units outside of the gradient coil unit, whereby e.g. the gradient coil unit can be constructed in a very efficient and compact manner. Moreover this arrangement makes possible a small radial space requirement of the detector unit, which makes possible a large patient receiving area. The fixing unit may still make possible a mechanical coupling of the shim unit to the gradient coil unit, whereby forces and vibrations can be absorbed especially well. This makes it possible to record image data in an especially high quality.

One form of embodiment of the detector unit makes provision for the shim units and the gradient coil unit to form one gradient unit, with said gradient unit having a second inner surface, with said second inner surface corresponding to the side of the gradient unit pointing towards the cylinder axis, and the RF screen is embodied in such a way that said screen is flush with the second inner surface.

The gradient unit comprising the shim units and the gradient coil unit can be seen as a virtual unit for the purpose of defining the second inner surface. The gradient unit typically does not provide for any coalescence of the gradient coil unit and the shim units. The first inner surface is typically formed from epoxy resin. A shim box receptacle comprised by a shim unit typically comprises a plastic, for example a glass fiber reinforced plastic. A shim plate comprised by a shim unit typically comprises iron.

At the positions in the circumferential direction that are free of a shim unit of the shim units, the second inner surface can correspond to the first inner surface.

At the positions in the circumferential direction at which one shim unit of the shim units is arranged, the second inner surface typically differs from the first inner surface. At the positions in the circumferential direction at which a shim unit of the shim units is arranged, the second inner surface typically follows the local raised areas.

In accordance with this embodiment, the RF screen is embodied in such a way that said screen is typically at any suitable range of distances, e.g. a distance of less than 2 mm, of less than 1 mm, of less than 0.5 mm, etc., from the second inner surface. The RF screen can be referred to as "enveloping" the second inner surface. The RF screen may e.g. have a form adapted to the second inner surface. The RF screen may e.g. have a stepped shape, which in the circumferential direction rests alternately against the first inner surface and the surfaces of the local raised areas facing towards the cylinder axis. The transition between two adjacent sections in each case is typically also covered by the RF screen. This form of embodiment makes possible an especially compact construction of the detector unit with little radial spatial extent.

One form of embodiment of the detector unit makes provision for the RF screen to comprise a flexible printed circuit board and/or metal film, which clings to the second inner surface. In accordance with this embodiment, the RF screen can be manufactured monolithically and/or free from solder points. This makes possible a particularly simple manufacturing method, and is especially compact due to the lack of soldering.

One embodiment of the detector unit makes provision for the RF screen to comprise a number of metal plates linked conductively (e.g. electrically conductively, i.e. galvanically) to one another. In accordance with this embodiment, the RF screen can be made from a number of printed circuit boards and/or a number of metal films, which e.g. are soldered to one another at the steps. This makes possible an especially good adaptation of the RF screen to the second inner surface. Moreover, an RF screen of this type is embodied especially robustly.

One embodiment of the detector unit makes provision for fixing unit to comprise a sealing compound. The sealing compound can comprise epoxy resin, for example. This makes possible an especially robust fixing of the shim units to the gradient coil unit. The RF screen, the shim units and the gradient coil unit can be jointly encapsulated with sealing compound. The RF screen in this case may e.g. form the inner surface of the encapsulated units facing towards the cylinder axis. The inner surface of the RF screen facing towards the cylinder axis may be free from the sealing compound.

One embodiment of the detector unit makes provision for at least one shim unit of the at least four shim units to have a surface free from a coating with a screening effect. This of embodiment makes provision e.g. for a shim box receptacle comprised by the shim unit to have a surface free from an electrically conductive surface. A coating with a screening effect can comprise a conductive material, such as metal, for example. The shim plates arranged within a shim box receptacle are typically electrically conductive. For example, all shim box receptacles of the shim units may be free from a metallization. In accordance with this embodiment, the RF screen is embodied to screen the shim units from the RF pulses. This enables a further screening, by means of a metalized surface for example, to be dispensed with. This makes possible a low-cost and compact construction of the shim units and the detector unit.

One embodiment of the detector unit makes provision for the shim units and the gradient coil unit to form one gradient unit, for the fixing unit to comprise an electrically isolating hollow cylinder, which is arranged between the gradient unit and the radio frequency antenna unit, for the shim units to have a surface with an electrically conductive coating, and for the RF screen to be embodied in such a way that said screen is at least partly flush with the first inner surface.

The isolating hollow cylinder, the gradient coil unit, and the radio frequency antenna unit may for example be arranged concentrically. The electrically isolating hollow cylinder typically comprises a plastic, for example a glass fiber reinforced plastic (GRP) and/or a carbon-fiber reinforced plastic (CFRP). The RF screen can be embodied as a hollow cylinder and/or rest against the inner side of the gradient coil unit facing towards the cylinder axis. The RF screen can have cutouts. The shim units, e.g. shim box receptacles comprised by said units, may have a metalized surface, e.g., a coating with copper. The thickness of the coating of the surface can amount to between 51 µm and 501 µm for instance. The shim box receptacles can predominantly or entirely comprise copper. The size, e.g. the radius, of the electrically isolating hollow cylinder is selected such that said cylinder stabilizes the shim units and/or presses against the gradient coil unit at the first inner surface. This form of embodiment makes possible flexible manufacturing of the detector unit. Moreover, the electrically isolating hollow cylinder absorbs forces and vibrations.

One form of embodiment of the detector unit makes provision for the RF screen to have cutouts at positions of the local raised areas. In accordance with this embodiment, the RF screen has cutouts parallel to the cylinder axis at the positions in the circumferential direction at which the shim units are arranged. A screening of the shim units from the radio frequency pulses is achieved at the same time by its surface with electrically conductive coating, so that this does not require any screening by the RF screen. The RF screen can comprise bridging units, for example in the form of radio frequency capacitors, which electrically connect individual modules of the RF screen to one another across the cutouts. This makes possible a reduction of the eddy current surfaces while simultaneously maintaining the required electrical conductivity for the electrical currents induced by the radio frequency pulses. This construction is especially frugal in respect of the materials of the RF screen and is compact.

One form of embodiment of the detector unit makes provision for the fixing unit to comprise a further electrically isolating hollow cylinder, which is arranged between the gradient coil unit and the shim units. The further electrically isolating hollow cylinder typically has a larger radius than the electrically isolating hollow cylinder. The further electrically isolating hollow cylinder typically comprises a plastic, for example Glass Reinforced Plastic (GRP) and/or Carbon-fiber-reinforced polymers (CFRP).

The further electrically isolating hollow cylinder and the electrically isolating hollow cylinder are typically concentric to one another. For example, the unit comprising the shim units, the further electrically isolating hollow cylinder, and the electrically isolating hollow cylinder can be manufactured separately, for example, as a double cylinder structure. The gradient coil unit can conventionally be encapsulated, e.g. together with the RF screen. Subsequently, the double cylinder structure can be arranged within the gradient coil unit. As an alternative, the double cylinder structure can be encapsulated jointly with the gradient coil unit and the RF screen.

One embodiment of the detector unit makes provision for the fixing unit to comprise a hanger unit at both ends of the gradient coil unit in the longitudinal direction. The fixing unit, e.g. the two suspension units, can be embodied as end rings, which for example hold the shim units cantilevered. The fixing unit in accordance with this embodiment is free from a surface connection along the longitudinal direction. This embodiment is free from solder contacts between the RF screen and the shim units and is simple to manufacture.

One embodiment of the detector unit makes provision for the RF screen to be embodied in such a way that said screen is at least partly flush with the first inner surface and/or the shim units have a surface with an electrically conductive coating. The RF screen can accordingly be embodied in the shape of a hollow cylinder and optionally have cutouts at the positions in the circumferential direction at which the shim units form local raised areas. If the RF screen has cutouts, the shim units typically have a conductive coating of the surface. As an alternative to the conductive coating, the shim box receptacles comprised by the shim units can comprise electrically conductive material and/or be formed from said material. This embodiment reduces the formation of eddy currents and thus the heating of the shim plates. At the same time, the Q factor of the radio frequency antenna unit is increased.

One embodiment of the detector unit makes provision for the gradient coil unit to have a primary coil unit and to be free from a secondary coil unit. The primary coil unit can e.g. comprise three primary coils, wherein each one of the three primary coils is embodied to generate a magnetic field gradient in one of three spatial directions orthogonal to one another in each case. The primary coil unit is typically embodied for generation of a magnetic field gradient in the patient receiving area.

Conventionally, the effect of the primary coil unit outside of the patient receiving area is largely suppressed by a secondary coil unit assigned to the primary coil unit. The secondary coil unit conventionally surrounds the corresponding primary coil unit concentrically. The greater is the radial distance between the primary coil unit and a conventional secondary coil unit, the less is the effect of higher-order eddy currents on the primary coil unit, which improves the homogeneity of the magnetic field gradient generated by the gradient coil unit.

The radial distance between the primary coil unit and a conventional secondary coil unit can accordingly be used with a conventional gradient coil unit for the integration of shim units, without the diameter of the patient receiving area being influenced by this. If the gradient coil unit is free from a secondary coil unit, the height of the shim unit can have an effect on the diameter of the patient receiving area, which can be reduced by the height of the shim unit in the radial direction. Consequently, for this embodiment of the detector unit, a space-saving arrangement of the shim unit between gradient coil unit and the radio frequency antenna unit and a corresponding integration of the RF screen is especially advantageous.

One form of embodiment of the detector unit comprises a stabilization unit arranged between two neighboring local raised areas in the circumferential direction. The stabilization unit may e.g. fill the gaps between two neighboring shim units in each case. The stabilization unit e.g. comprises material suitable for stiffening the detector unit, for example epoxy resin and/or GRP and/or CFRP. The stabilization unit may e.g. comprise material that minimizes dielectric RF losses. This embodiment makes an especially stable detector unit possible, which is advantageous with respect to the space-saving and radially thin construction of the detector unit. Moreover, the stabilization unit is suitable for reducing acoustic noise. The stabilization unit can also correspond to the fixing unit, at least in part.

One embodiment of the detector unit makes provision for the radio frequency antenna unit to have a number of rods, each in parallel to the cylinder axis at various positions in the circumferential direction, wherein the positions of the number of rods differ from the positions of the at least four shim units.

The radio frequency antenna unit is typically embodied as a "birdcage" coil. The number of rods comprised by the radio frequency antenna unit may e.g. have a rectangular cross section. The number of rods are typically arranged parallel to the cylinder axis in each case. The positions of the number of rods in the circumferential direction differ in accordance with this form of embodiment from the positions of the local raised areas in the circumferential direction. In an embodiment, a rod of the number of rods is arranged between two neighboring local raised areas. Two rods of the number of rods can also be arranged between two neighboring local raised areas. The number of rods may e.g. be at an equal first distance, the first radius, from the cylinder axis. The shim units may e.g. be at an equal second distance, the second radius from the cylinder axis. The first radius and the second radius may differ by any suitable dimension, e.g. less than 5 mm, by less than 3 mm, by less than 1.5 mm, etc. The first radius can be greater than the second radius. The first radius can correspond to the second radius.

In accordance with this embodiment, the rods are arranged between the shim units. This makes possible an especially space-saving arrangement with a toothed-wheel shaped meshing of the various units of the detector unit. Such a detector unit has an especially small radial spatial extent. Moreover, in accordance with this embodiment, mirror currents on the RF screen and the losses associated therewith can be reduced, whereby the efficiency of the radio frequency antenna unit is increased.

Furthermore, the disclosure emanates from a magnetic resonance device with a main magnet and an inventive detector unit. Embodiments of the magnetic resonance device may be embodied similarly to the forms of embodiment of the detector unit. The advantages of the magnetic resonance device essentially correspond to the advantages of the detector unit, which have been set out above in detail. Features, advantages, or alternate forms of embodiments herein can likewise be transferred to the other claimed subject matter, and vice-versa.

BRIEF DESCRIPTION OF THE DRAWINGS

Further advantages, features, and particulars of the disclosure emerge from the exemplary embodiments described below and also with the aid of the drawings.

In the figures:

FIG. 7 illustrates an example magnetic resonance device in a schematic diagram.

DETAILED DESCRIPTION OF THE DISCLOSURE

Figure 1:
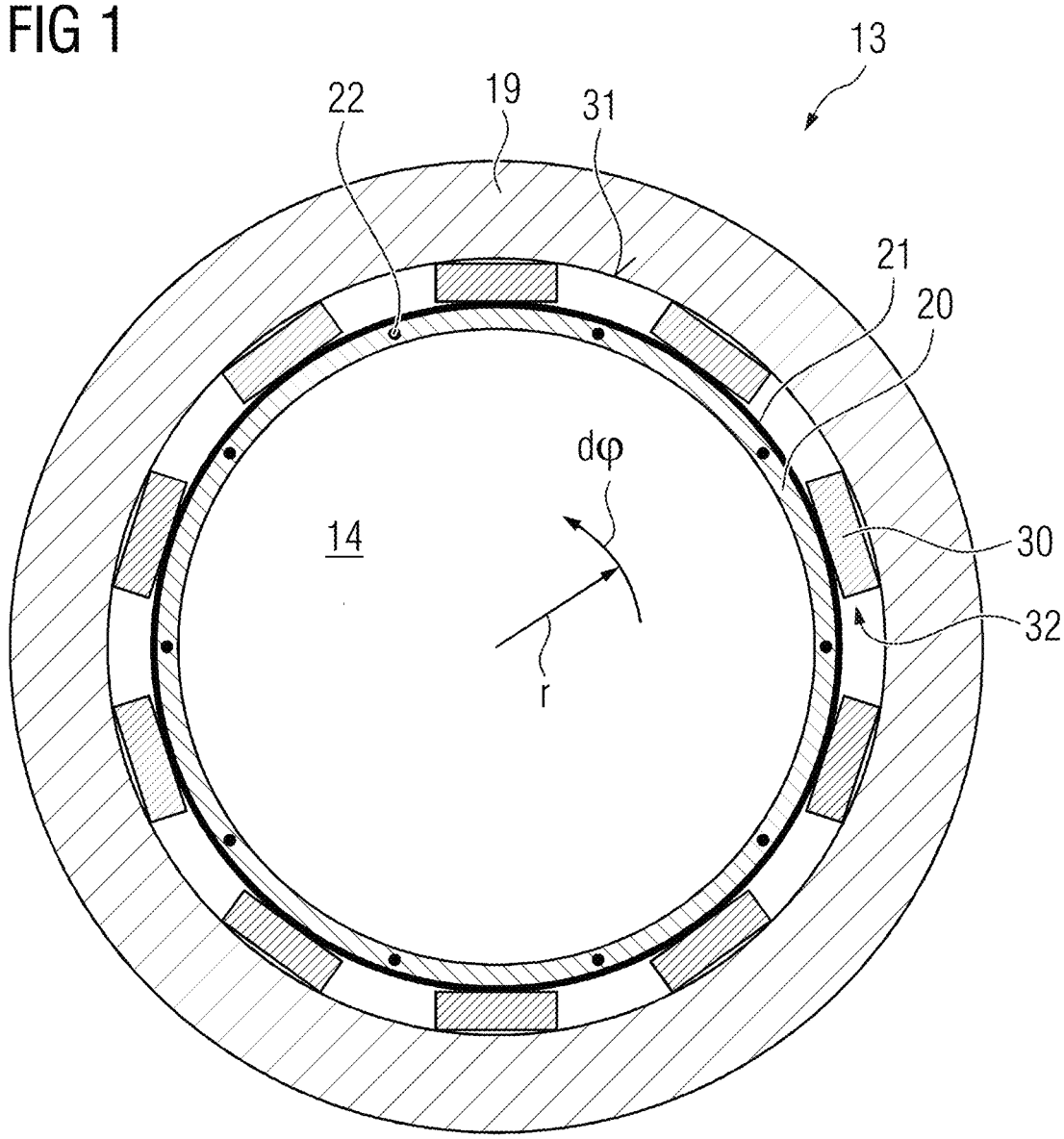
FIG. 1 illustrates an example first embodiment of a detector unit in a schematic diagram in a first view.

FIG. 1 illustrates an example first embodiment of a detector unit 13 (also referred to herein simply as a detector) in a schematic diagram in a first view. The detector unit 13 comprises a radio frequency (RF) antenna unit 20 (also referred to herein as an RF antenna assembly) and a gradient coil unit 19 (also referred to herein as a gradient coil assembly) concentrically surrounding the RF antenna unit 20. The RF antenna unit 20 and the gradient coil unit 19 are each embodied as hollow cylinders and surround a cylinder axis z (into/out of the page) in the longitudinal direction. The detector unit 13 comprises at least four shim units 30 (also referred to herein as shims), which are elongated and each arranged parallel to the cylinder axis z at various positions in the circumferential direction dip. For example, the units 30 are arranged on a first inner surface 31, with said first inner surface 31 corresponding to a side of the gradient coil unit 19 facing towards the cylinder axis z. The shim units 30 thereby form local raised areas in the direction of the cylinder axis z on the first inner surface 31. The detector unit 13 comprises a fixing unit 32 (also referred to herein as a retaining assembly) configured for fixing (i.e. retaining) the shim units 30 to the gradient coil unit 19. Moreover, the detector unit 13 comprises an RF screen 21, which is arranged at least in part between the radio frequency antenna unit 20 and the gradient coil unit 19.

Optionally, the detector unit 13 can comprise a stabilization unit (not shown in any greater detail), which is arranged between two neighboring local raised areas in the circumferential direction dy. The stabilization unit (also referred to herein as a stabilizer) can also correspond to the fixing unit 32. The RF antenna unit 20 can comprise a number of rods 22, which are each arranged parallel to the cylinder axis z at various positions in the circumferential direction dip. The positions in circumferential direction dip of the number of rods 22 differ in this case from the positions of the shim units 30. For example, as in the case shown, one rod of the number of rods 22 is arranged in each case in the circumferential direction dip between two neighboring shim units 30 of the shim units 30. The rods 22 can also be arranged similarly to the embodiment shown in FIG. 1 in the other embodiments shown but, in the following figures, are not shown in any greater detail for the sake of clarity.

Figure 2:
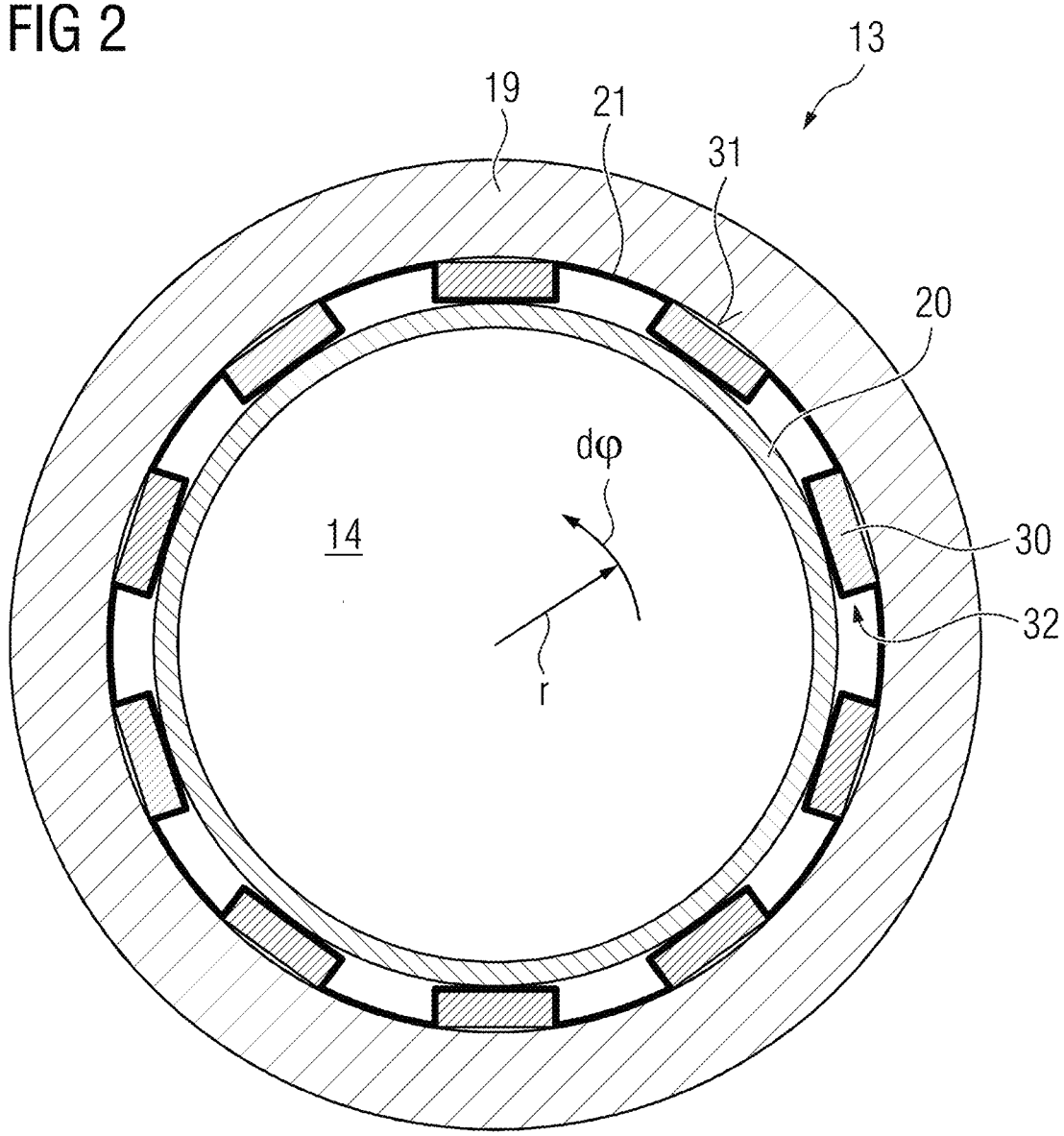
FIG. 2 illustrates an example second embodiment of a detector unit in a schematic diagram in a first view.

FIG. 2 illustrates an example second embodiment of the detector unit 13 in a schematic diagram in a first view. The shim units 30 and the gradient coil unit 19 can be grouped into a gradient unit (also referred to herein as a gradient assembly), wherein the side of the gradient unit facing towards the cylinder axis z is referred to as the second inner surface. The RF screen 21 is embodied in such a way that said screen is flush with the second inner surface. This enables the surfaces of the shim units 30 to be embodied free from a coating with a screening effect. The fixing unit 32 comprises a sealing compound, which may e.g. at least partly fill the spaces between neighboring shim units 30, i.e. between neighboring local raised areas. The fixing unit 32 can have a stabilizing effect, e.g. on the shim units 30. The fixing unit 32 can correspond to the stabilization unit. Moreover, the gradient coil unit 19 may have only one primary coil unit (also referred to herein as a primary coil assembly) and is free from a secondary coil unit (also referred to herein as a secondary coil assembly).

Figure 3:
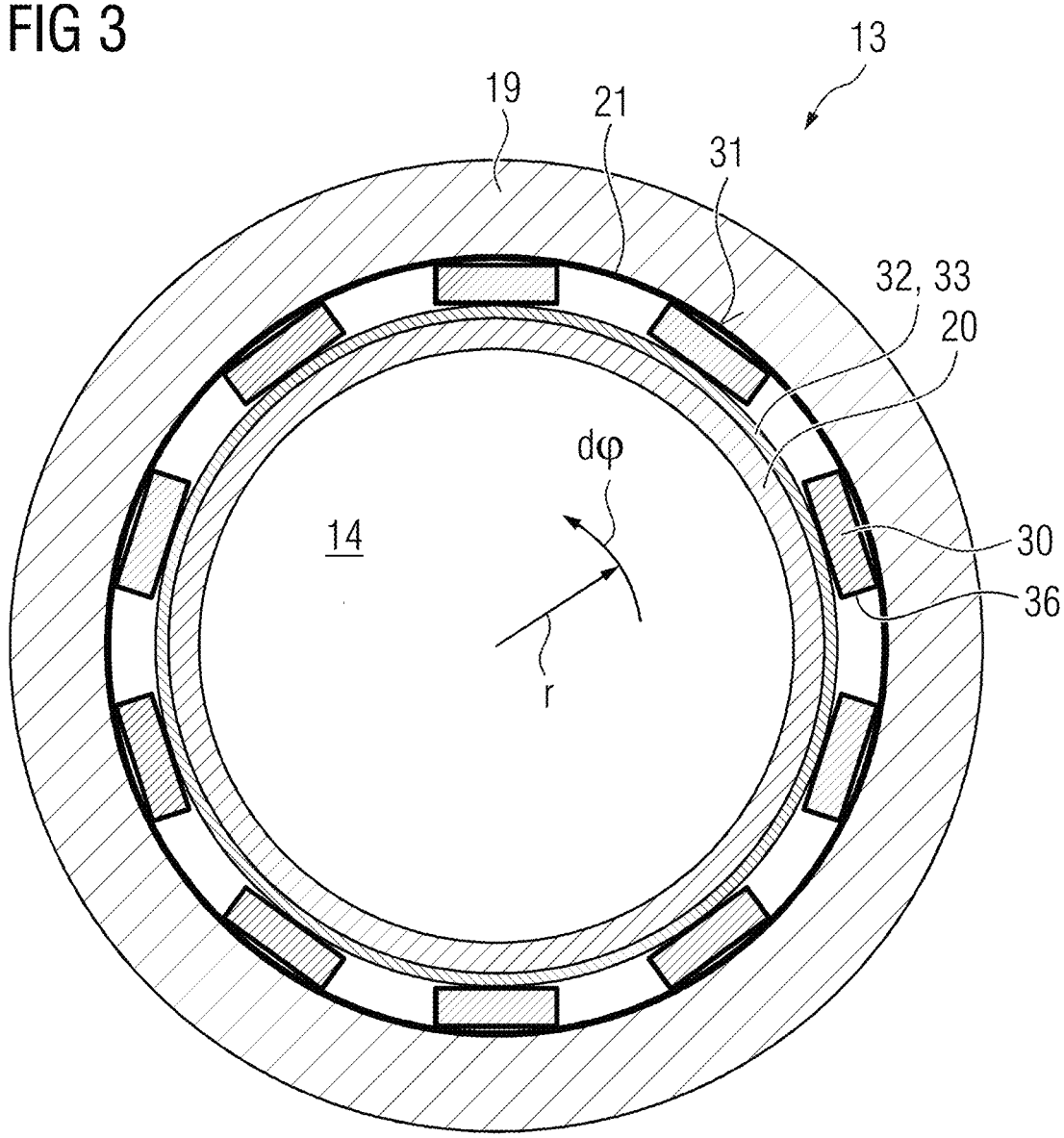
FIG. 3 illustrates an example third embodiment of a detector unit in a schematic diagram in a first view.

FIG. 3 illustrates an example third embodiment of a detector unit in a schematic diagram in a first view. In accordance with this third embodiment, the fixing unit 32 comprises an electrically-isolating hollow cylinder 33, which is arranged between the gradient unit and the RF antenna unit 20. The shim units 30 have a surface with an electrically-conductive coating 36, and the RF screen 21 is embodied in such a way that said screen is at least partly flush with the first inner surface 31.

Figure 4:
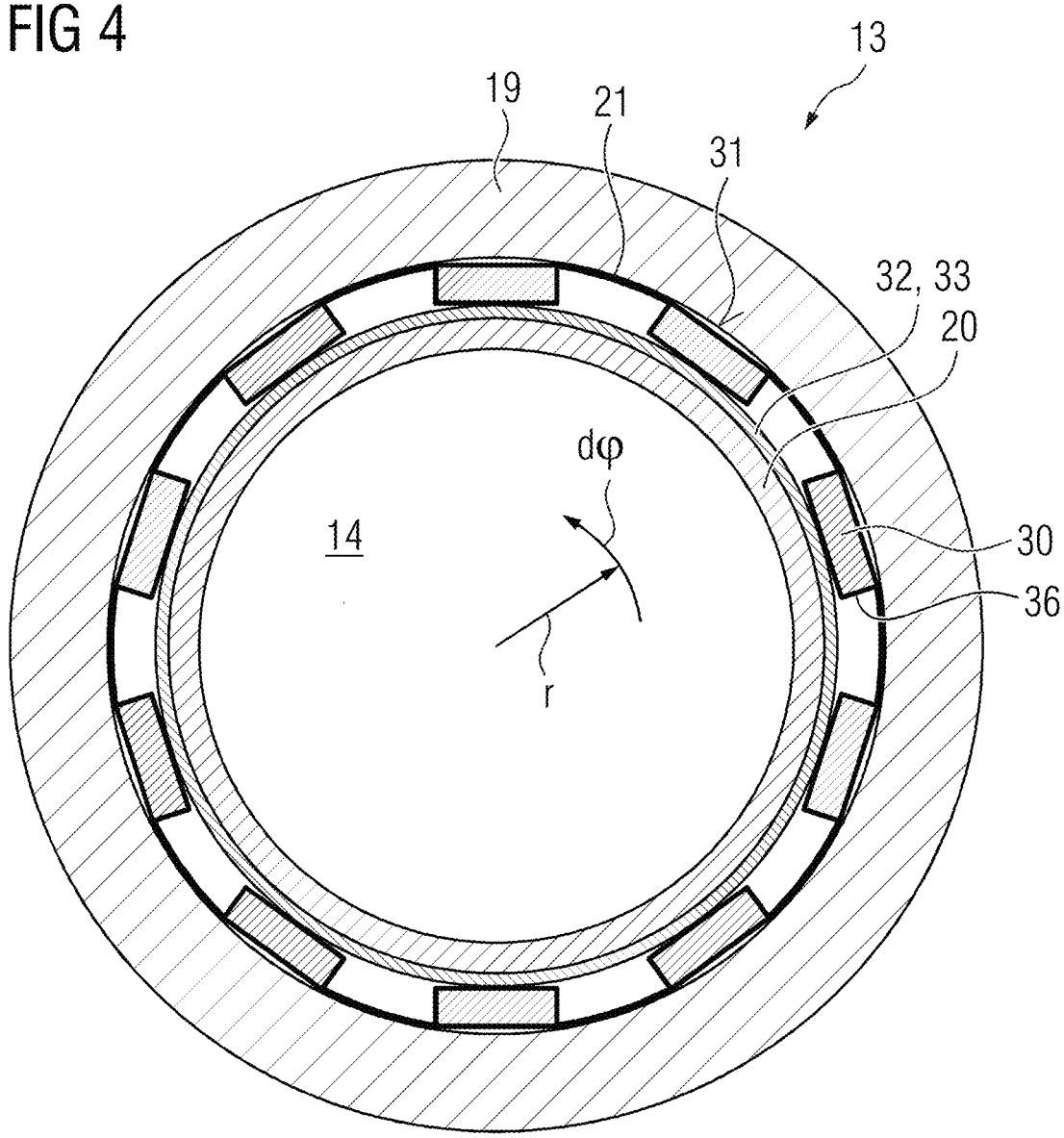
FIG. 4 illustrates an example fourth embodiment of a detector unit in a schematic diagram in a first view.

FIG. 4 illustrates an example fourth embodiment of a detector unit in a schematic diagram in a first view. This embodiment differs from the third embodiment in that the RF screen 21 has cutouts at positions of the local raised areas, i.e. at positions in circumferential direction dip of the shim units 30.

Figure 5:
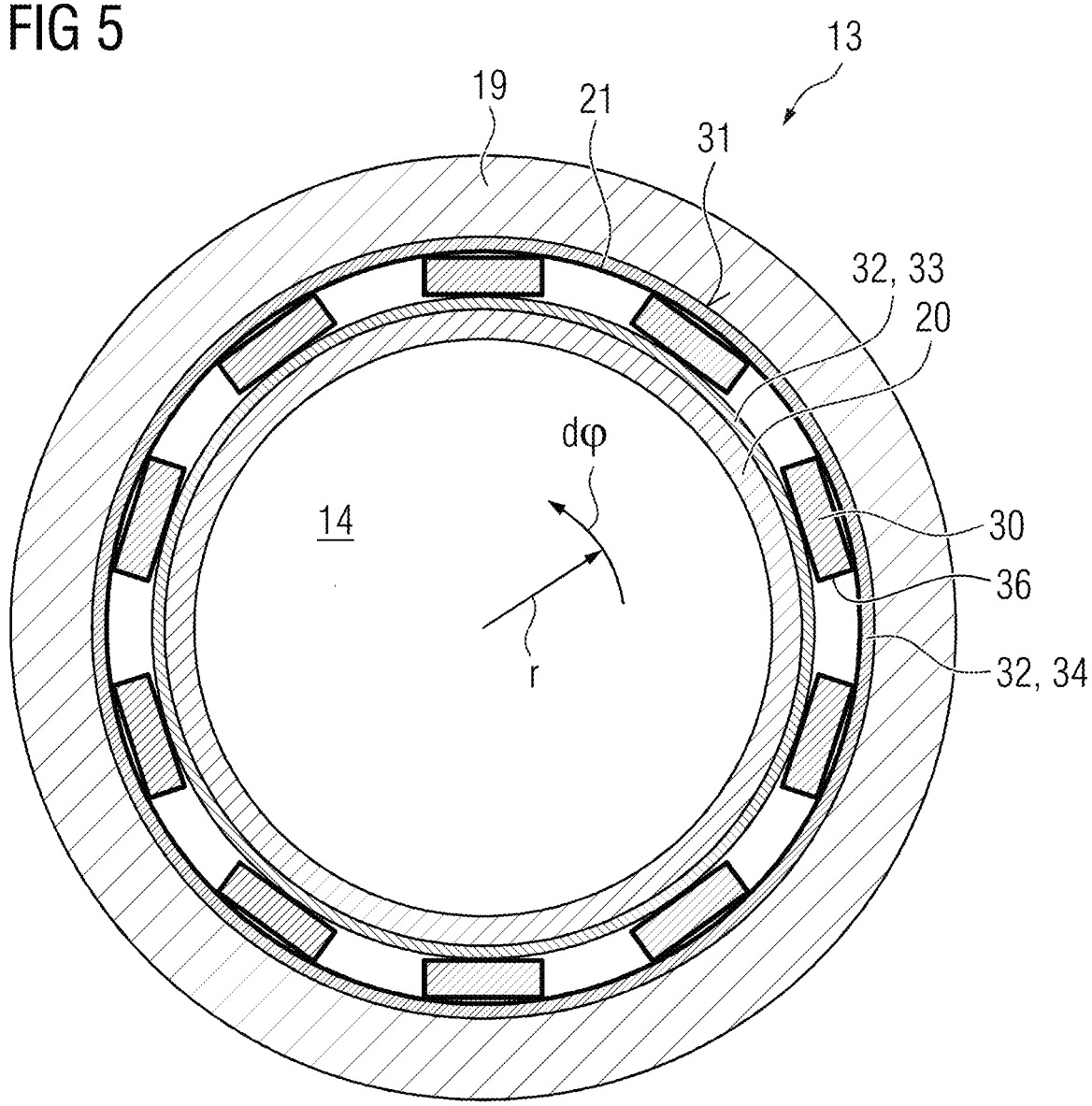
FIG. 5 illustrates an example fifth embodiment of a detector unit in a schematic diagram in a first view.

FIG. 5 illustrates an example fifth embodiment of a detector unit in a schematic diagram in a first view. The fifth embodiment differs from the fourth embodiment or the third embodiment in that the fixing unit 32 comprises a further electrically-isolating hollow cylinder 34, which is arranged between the gradient coil unit 19 and the shim units 30.

Figure 6:
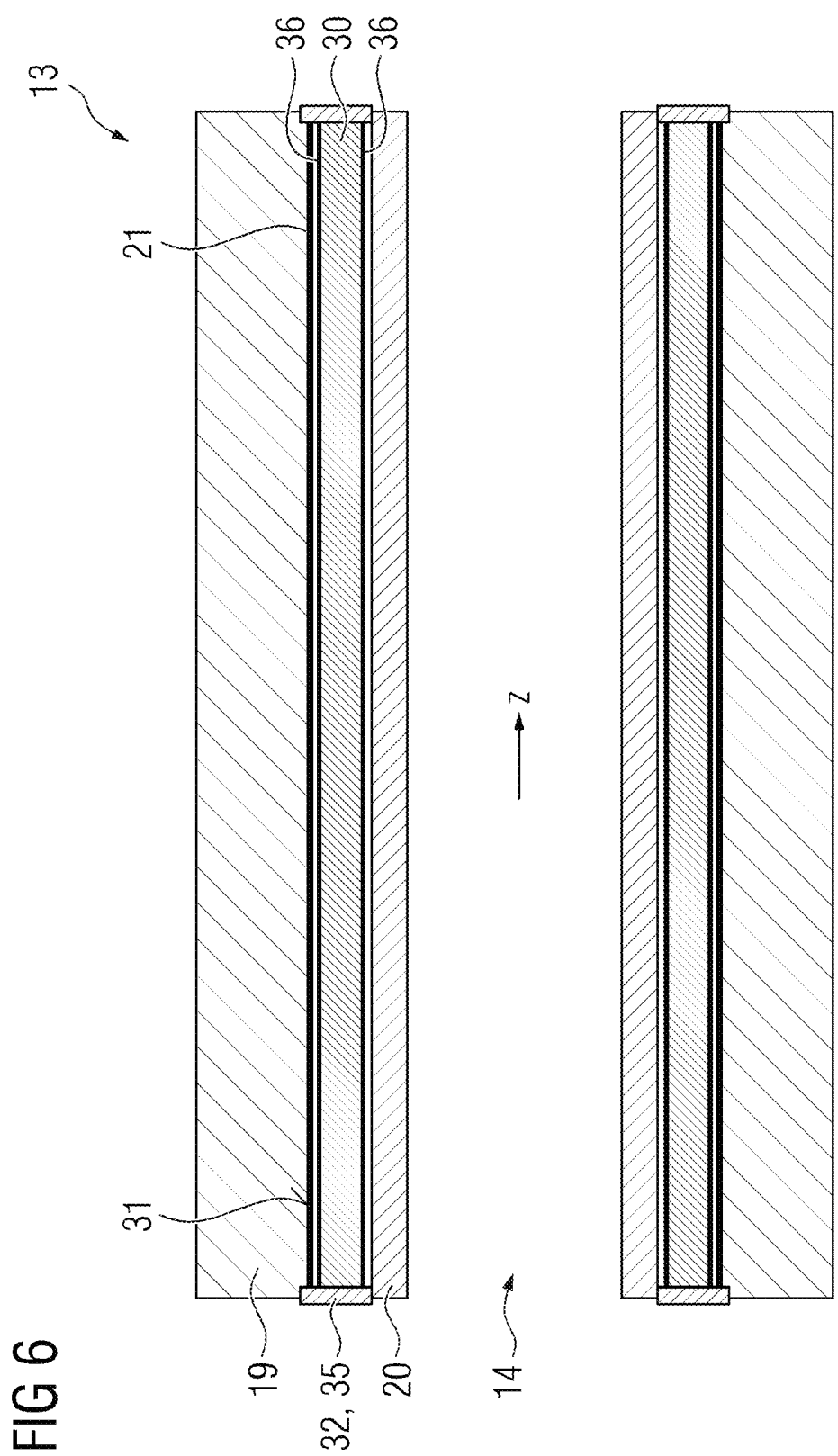
FIG. 6 illustrates an example sixth embodiment of a detector unit in a schematic diagram in a second view.

FIG. 6 illustrates an example sixth embodiment of a detector unit in a schematic diagram in a second view. The second view is at right angles to the first view. In accordance with this embodiment, the fixing unit 32 comprises a hanger unit 35 (also referred to herein as a hanger or a hanger assembly) at both ends of the gradient coil unit 19 in each case. The RF screen 21 in this case is embodied in such a way that said screen is at least partly flush with the first inner surface 31. In addition, the shim units 30 have a surface with an electrically-conductive coating 36.

FIG. 7 illustrates an example magnetic resonance device 11 in a schematic diagram. The magnetic resonance device 11 comprises a detector unit 13 and a main magnet 17 for generation of a strong and in particular constant main magnetic field 18 parallel to the longitudinal direction z, e.g. parallel to the cylinder axis. Moreover, the magnetic resonance device 11 has a cylindrical patient receiving area 14 for receiving a patient 15, wherein the patient receiving area 14 is surrounded cylindrically in a circumferential direction by the detector unit 13. The patient 15 can be pushed by means of a patient support facility 16 of the magnetic resonance device 11 into the patient receiving area 14. For this purpose, the patient support facility 16 has a patient table, which is arranged movably within the magnetic resonance device 11. The detector unit 13 further comprises a RF antenna unit 20 that, in the case shown, is embodied as a body coil integrated into the magnetic resonance device 11, and a RF antenna control unit 29 for exciting a polarization, which arises in the main magnetic field 18 generated by the main magnet 17. The RF antenna unit 20 is activated by the RF antenna control unit 29 and radiates high-frequency radio frequency pulses into an examination space, which is essentially formed by the patient receiving area 14.

Furthermore, the detector unit 13 comprises a gradient coil unit 19, which is used for spatial encoding during imaging. The gradient coil unit 19 is activated by means of a gradient control unit 28. Moreover, the detector unit 13 has shim units 30, which comprise shim boxes and shim plates.

For control of the main magnet 17, the gradient control unit 28, and the RF antenna control unit 29, the magnetic resonance device 11 comprises a control unit 24. The control unit 24 centrally controls the magnetic resonance device 11, such as for example the carrying out of MR control sequences. The magnetic resonance device 11 comprises a display unit 25. Moreover the magnetic resonance device 11 has an input unit 26, by means of which information and/or control parameters can be input during a measurement process by a user. The control unit 24 can comprise the gradient control unit 28 and/or RF antenna control unit 29 and/or the display unit 25 and/or the input unit 26.

The magnetic resonance device 11 shown may comprise additional or alternative components that magnetic resonance devices 11 normally have. Moreover, a general way in which a magnetic resonance device 11 functions is known to the person skilled in the art so that a more detailed description of the further components will not be given here.

Although the disclosure has been illustrated and described in more detail by the preferred exemplary embodiments, the disclosure is not restricted by the disclosed examples and other variations can be derived herefrom by the person skilled in the art, without departing from the scope of protection of the disclosure. Independent of the grammatical term usage, individuals with male, female or other gender identities are included within the term.

The various components described herein may be referred to as "units." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units, as applicable and relevant, may alternatively be referred to herein as "circuitry," "controllers," "processors," or "processing circuitry," or alternatively as noted herein.

What is claimed is:

1. A detector, comprising:
   a radio frequency (RF) antenna assembly;
   a gradient coil assembly concentrically surrounding the RF antenna assembly,
   wherein the RF antenna assembly and the gradient coil assembly each comprise a hollow cylinder surrounding a cylinder axis in a longitudinal direction;
   a plurality of shims arranged parallel to the cylinder axis and disposed on a first inner surface in a circumferential direction, each one of the plurality of shims comprising an oblong shape,
   wherein the first inner surface corresponds to a side of the gradient coil assembly facing the cylinder axis, and
   wherein each one of the plurality of shims forms a respective local raised area in a direction of the cylinder axis;
   a retaining assembly configured to retain the plurality of shims to the gradient coil assembly; and
   an RF screen arranged at least partially between the RF antenna assembly and the gradient coil assembly.

2. The detector as claimed in claim 1, wherein:
   the plurality of shims and the gradient coil assembly form a gradient assembly having a second inner surface,
   the second inner surface corresponds to a side of the gradient assembly facing the cylinder axis, and
   the RF screen is flush with the second inner surface.

3. The detector as claimed in claim 2, wherein the RF screen is coupled to the second inner surface and comprises a flexible printed circuit board.

4. The detector as claimed in claim 2, wherein the RF screen is coupled to the second inner surface and comprises a metal film.

5. The detector as claimed in claim 1, wherein the RF screen comprises a plurality of metal plates galvanically connected to one another.

6. The detector as claimed in claim 1, wherein the retaining assembly comprises a sealing compound.

7. The detector as claimed in claim 1, wherein at least one of the plurality of shims comprises a surface free from a coating having a screening effect.

8. The detector as claimed in claim 1, wherein:
   the plurality of shims and the gradient coil assembly form a gradient assembly,
   the retaining assembly comprises an electrically-isolating hollow cylinder, which is arranged between the gradient retaining assembly and the RF antenna retaining assembly,
   each one of the plurality of shims has a surface with an electrically-conductive coating, and
   the RF screen is at least partly flush with the first inner surface.

9. The detector as claimed in claim 1, wherein the RF screen comprises cutouts at positions corresponding to each respective one of the local raised areas.

10. The detector as claimed in claim 1, wherein the retaining assembly comprises a further electrically-isolating hollow cylinder, which is arranged between the gradient coil assembly and the plurality of shims.

11. The detector as claimed in claim 1, wherein the retaining assembly comprises a hanger assembly disposed at each end of the gradient coil assembly in the longitudinal direction.

12. The detector as claimed in claim 1, wherein the RF screen is at least partly flush with the first inner surface.

13. The detector as claimed in claim 1, wherein the plurality of shims have a surface with an electrically-conductive coating.

14. The detector as claimed in claim 1, wherein the gradient coil assembly comprises a primary coil assembly and is free of a secondary coil assembly.

15. The detector as claimed in claim 1, further comprising:
   a stabilizer arranged between at least two adjacent ones of the local raised areas in the circumferential direction.

16. The detector as claimed in claim 1, wherein the RF antenna assembly comprises a plurality of rods disposed parallel to the cylinder axis in the circumferential direction, and
   wherein the plurality of rods are disposed at different locations than the plurality of shims.

17. A magnetic resonance device, comprising
   a main magnet; and
   a detector, comprising:
      a radio frequency (RF) antenna assembly;
      a gradient coil assembly concentrically surrounding the RF antenna assembly,
      wherein the RF antenna assembly and the gradient coil assembly each comprise a hollow cylinder surrounding a cylinder axis in a longitudinal direction,
      a plurality of shims arranged parallel to the cylinder axis and disposed on a first inner surface in a circumferential direction, each one of the plurality of shims comprising an oblong shape,
      wherein the first inner surface corresponds to a side of the gradient coil assembly facing towards the cylinder axis, and
      wherein each one of the plurality of shims forms a respective local raised area in a direction of the cylinder axis,
      a retaining assembly configured to retain the plurality of shims to the gradient coil assembly; and
      an RF screen arranged at least partly between the RF antenna assembly and the gradient coil assembly.

* * * * *